United States Patent
Tribo et al.

(10) Patent No.: US 6,348,117 B1
(45) Date of Patent: *Feb. 19, 2002

(54) PROCESS OF PREPARING TEXTURED FLUOROPOLYMER FILMS

(75) Inventors: Mark Joseph Tribo, East Amherst, NY (US); Robert G. Pembleton, Wilmington, DE (US); Michael James Merrill, New Castle, DE (US); Akhileswar Ganesh Vaidyanathan, Hockessin, DE (US)

(73) Assignee: E. I. du Pont de Nemours and Company, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,660

(22) Filed: Oct. 6, 1997

Related U.S. Application Data

(60) Provisional application No. 60/027,513, filed on Oct. 7, 1996.

(51) Int. Cl.[7] ............................................. B29C 39/02
(52) U.S. Cl. ...................... 156/245; 156/246; 264/544; 264/316; 264/320; 264/322; 264/331.14; 264/294
(58) Field of Search ................................ 264/216, 299, 264/331.14, 127, 544, 553, 554, 316, 313, 320, 322, 294; 156/242, 246, 245

(56) References Cited

U.S. PATENT DOCUMENTS

| | | | | |
|---|---|---|---|---|
| 3,692,621 A | | 9/1972 | Frech ........................... 161/116 |
| 4,329,385 A | * | 5/1982 | Banks et al. .................. 428/141 |
| 4,664,859 A | * | 5/1987 | Knoop ......................... 264/102 |
| 4,693,926 A | | 9/1987 | Kowalski et al. ............. 428/204 |
| 4,721,592 A | | 1/1988 | Fruehauf et al. ............. 264/171 |
| 4,877,683 A | | 10/1989 | Bragaw et al. .............. 428/421 |
| 4,883,716 A | * | 11/1989 | Effenberger et al. ......... 264/216 |
| 4,931,324 A | | 6/1990 | Ellison et al. ................. 428/31 |
| 5,000,809 A | * | 3/1991 | Adesko et al. ............... 156/242 |
| 5,108,836 A | * | 4/1992 | Ocampo et al. ............. 156/242 |
| 5,114,515 A | * | 5/1992 | Birdwell et al. ............. 156/246 |
| 5,137,775 A | | 8/1992 | Davis et al. ................. 428/216 |
| 5,215,826 A | * | 6/1993 | Shimanski et al. ......... 428/483 |
| 5,250,597 A | | 10/1993 | Uschold ...................... 524/280 |
| 5,284,693 A | | 2/1994 | Spain et al. ................. 428/172 |
| 5,325,301 A | | 6/1994 | Knoff et al. ................. 364/552 |
| 5,503,905 A | * | 4/1996 | Boris .......................... 428/195 |
| 5,536,539 A | | 7/1996 | Ellison et al. ................. 428/31 |
| 5,725,712 A | * | 3/1998 | Spain et al. ................. 156/246 |
| 5,750,234 A | * | 5/1998 | Johnson et al. ............. 428/141 |
| 5,972,472 A | * | 10/1999 | Uschold et al. ............. 428/141 |
| 5,985,079 A | * | 11/1999 | Ellison ................... 156/244.23 |

FOREIGN PATENT DOCUMENTS

GB        1584117      2/1981

OTHER PUBLICATIONS

"Textured Features for Image Classification", by Haralick, Shanmugan and Dinstein, IEEE Transactions on Systems, Man and Cybernetics, vol., SMC–3, No. 6, Nov. 1973, pp. 610–621.

* cited by examiner

Primary Examiner—Jan H. Silbaugh
Assistant Examiner—Edmund H. Lee

(57) ABSTRACT

A method of texturing fluoropolymer film and the textured product produced, which product retains the texture imparted after further processing, such as in thermoforming or molding processes.

6 Claims, No Drawings

PROCESS OF PREPARING TEXTURED FLUOROPOLYMER FILMS

RELATED APPLICATIONS

The present application claims benefit of U.S. Provisional Application No. 60/027,513, filed Oct. 7, 1996.

FIELD OF INVENTION

The subject matter of the instant invention relates to a method of texturing fluoropolymer film and the textured product produced, which product retains the texture imparted even after further processing, such as in thermoforming or molding processes.

BACKGROUND OF THE INVENTION

Fluoropolymer films have long been used as a protective overlay for a variety of substrates such as metal, wood, and thermoplastic and thermoset polymers. With its excellent chemical resistance and weathering properties, a thin layer of fluoropolymer film can protect less resilient substrates from damage in both exterior and interior use. Fluoropolymer films, especially polyvinylfluoride (PVF) are consistently used in preparing decorative laminates for aircraft interiors because these films exhibit good flame resistance and low smoke generation. In addition, PVF films can be printed with a variety of inks so that the resulting laminates are both aesthetically pleasing and functional.

Surface texturing is another desirable aesthetic quality of these laminate structures. Due to the difficulty of permanently texturing fluoropolymer films, especially polyvinylfluoride, such decorative laminates usually include an embossable resin layer. Inclusion of these embossing resins increases the cost and manufacturing complexity of such laminates.

Fluoropolymer-clad decorative laminates are rarely used in non-aircraft applications, such as mass transit vehicles (trains, buses, and subways). Reasons include less stringent flammability requirements, little concern for lightweight parts, and the high cost of fluoropolymer films. The incumbent materials for mass transit vehicle interiors have been metal and plastics, the latter including both thermoplastic and thermoset polymers. The most commonly used thermoplastics for this application are polyvinylchloride (PVC), acrylic resins, or blends of these two polymers. These materials are typically supplied as flat, embossed sheets that are subsequently thermoformed to produce the desired part, e.g. seat backs, arm rests and tray tables. Both the thermoplastic and thermoset systems, however, lack the chemical and stain resistance of fluoropolymer films. Recent interest in easier-to-maintain materials for mass transit applications, rather than merely low cost, has created renewed interest in fluoropolymer films, providing that texture issues can be resolved effectively.

Flexible PVC has been used for many years to produce textured vinyl fabrics such as synthetic leather. Although PVC and PVF are chemically similar, those skilled in the art recognize that flexible films of these two compounds have very different properties and formulations and are manufactured by different processes. In order to produce flexible material, PVC must be compounded with high-boiling, compatible solvents (generally referred to as plasticizers). The solvents employed have very high boiling points (b.p. >350° C.) in order to minimize evaporation during processing and in the final end use. The plasticizer remains in the PVC fabric, film or sheet, typically comprising 25 to 50% of the total weight of the resulting product. In contrast, cast fluoropolymer films such as PVF employ a latent solvent, for example, N,N-dimethylacetamide or propylene carbonate. The latent solvent does not actually dissolve the polymer; it swells the PVF so that the polymer particles coalesce into a continuous film. Once coalescence has occurred, the latent solvent is removed; it is not required for film flexibility as is the case with PVC. To facilitate removal, the boiling point of the latent solvent is relatively low. The most commonly used latent solvents for PVF boil at temperatures below 250° C. Consequently, a key distinction between PVF and flexible PVC is that the plasticizer (latent solvent) is removed from the PVF after coalescence. The level of residual solvent in PVF film is typically on the order of 1% or less by weight. Excessive residual latent solvent is undesirable since it may retard adhesion between the PVF film and an underlying substrate. Unlike PVC film, PVF film retains its flexibility without the need for a plasticizer.

Three different approaches have been used in the past to produce textured polyvinyl fluoride film laminate constructions. The first of these involves the aforementioned embossing resins, wherein a laminate construction of polyvinyl fluoride film includes an embossable resin, typically a polyurethane, sandwiched between the PVF layer and the supporting substrate, e.g., refer to U.S. Pat. No. 4,693,926 assigned to Boeing. The second technique involves mechanically embossing laminate constructions of preformed sheets of polyvinyl fluoride film fused to thermoplastic substrates by using, for example, grooved or heated embossing rolls and then quenching the laminate construction against a chill roll. Quenching "freezes in" the texture. The third technique involves mechanical embossing of preformed sheets of polyvinyl fluoride film itself as described in U.S. Pat. No. 4,721,592 (Fruehauf et al). According to this method, embossing is performed at temperatures in the range of 360° F. (180° C.) to 390° F. (200° C.). The reference discloses that an embossed film pattern so formed will survive deep vacuum forming of shaped panels. However, this method of embossing uses such elevated temperatures that have been associated with discoloring the polyvinyl fluoride film.

These approaches to texture polyvinyl fluoride film laminates and subsequently thermoform the laminate into parts have resulted in discolored laminates or parts with insufficient texture retention after the thermoforming process. This difficulty has severely limited the utility of polyvinyl fluoride films in non-aircraft applications.

SUMMARY OF THE INVENTION

The instant invention solves problems associated with conventional methods by providing a method for making textured fluoropolymer films. The textured films of this invention may then be subsequently processed such as in thermoforming or molding techniques wherein the textured nature of the fluoropolymer film is retained after the treatment process. The ability to obtain textured fluoropolymer film, which make it useful for aircraft interiors, is also important in "mass transit" applications, such as subways, buses, trains, among others. For example, a polyvinyl fluoride film surface is desirable due to its low maintenance, e.g., graffiti can be removed more easily than from other polymers.

The process of the present invention relates to preparing a textured fluoropolymer film as the film is being cast by (a) preparing a fluid composition comprising a fluoropolymer resin; (b) casting the fluoropolymer composition onto a textured support; (c) forming a coalesced fluoropolymer film layer upon the support; (d) drying the fluoropolymer film layer while in contact with the support; and (e) removing the support from the fluoropolymer film wherein the film contains the textural features of the textured support.

In one preferred aspect of the invention, the process further comprises thermoforming the textured film. Preferably, the process also comprises laminating the film to a substrate to form a laminate structure prior to thermoforming.

In accordance with another preferred aspect of the invention, process further comprises laminating the dried fluoropolymer film while still in contact with the textured support onto a substrate to form a laminate structure prior to removal of the support. Preferably, the process further comprises thermoforming the laminate structure after removal of the support.

In accordance with another preferred aspect of the invention, the textured film prepared by the process has a modified texture retention measure at 15% area expansion of greater than about 0.9.

In accordance with another preferred aspect of the invention, thermoformable textured fluoropolymer film and a laminate of such film to a thermoformable substrate are provided have a modified texture retention measure at 15% area expansion of greater than about 0.9.

DETAILED DESCRIPTION

The present invention is applicable to a wide range of weatherable films of fluoropolymers such as those prepared from trifluoroethylene, hexafluoropropylene, monochlorotrifluoroethylene, dichlorodifluoroethylene, tetrafluoroethylene polymers and copolymers; vinylidene fluoride polymers and copolymers; vinyl fluoride polymers and copolymers, among others. The fluoropolymer may also be a fluorinated ethylene/propylene copolymer, e.g., FEP resins, a copolymer of ethylene/chlorotrifluoroethylene, vinylidene fluoride/hexafluoropropylene and vinylidene fluoride/perfluoro (alkyl vinyl ether) dipolymers and terpolymers with tetrafluoroethylene, among others. A more detailed description of polymers can be found in U.S. Pat. Nos. 4,931,324 and 5,536,539. While any suitable fluoropolymer film can be employed, the present invention is particularly suited to films comprising polyvinyl fluoride (PVF). The nature and preparation of PVF films are described in greater detail in U.S. Pat. No. 4,877,683.

Fluoropolymer film of the present invention, and in particular polyvinyl fluoride, is noted for its attractiveness and its unusual combination of excellent resistance to outdoor weathering, a high degree of physical toughness, chemical inertness, good abrasion resistance, and also resistance to soiling as well as a significant retention of these properties at both low and elevated temperatures. The foregoing list of desirable properties permits using the PVF film in the form of a self-supporting film, but also as the outer layer of a wide variety of laminar structures wherein PVF films serve to upgrade less functional base layers, e.g., in the transportation industry for decorative, graffiti resistant surfaces.

The fluoropolymer films can be obtained from fluid compositions which are either (1) solutions or (2) polymer dispersions. Typical solutions comprise those prepared from polyvinylidene fluoride (PVDF), its copolymers, and blends of PVDF with acrylic and methacrylate polymers and copolymers. The solvents employed have boiling points sufficiently high to minimize bubble formation during the subsequent solution casting/drying process. Suitable solvents include methyl ethyl ketone, methyl isobutyl ketone, isophorone, and mono- and di-alkyl ethers of ethylene or diethylene glycol, such as ethylene glycol monoethyl ether, ethylene glycol monobutyl ether, diethylene glycol diethyl ether, etc. The polymer concentration in these solutions can be adjusted over a wide range of viscosities to suit the coating technique being employed. In most cases, the polymer concentration does not exceed approximately 25 percent by weight of the solution.

Fluoropolymer films of this invention may also be prepared from a dispersion, for example, by suspending PVF in a high-boiling, latent solvent such as propylene carbonate, N-methylpyrrolidone, sulfolane, gamma-butyrolactone, or N,N-dimethyl acetamide, among others. To this mixture are optionally added one or more pigments, such as titanium dioxide, iron oxide, and carbon black, among others. The PVF polymer and pigments are milled together, often with the help of a dispersing agent. A wide variety of mills can be used for the preparation of the dispersion. Typically, the mill employs a dense agitated grinding medium, such as sand, steel shot, glass beads, ceramic shot, Zirconia, or pebbles, as in a ball mill, an ATTRITOR® available from Union Process, Akron, Ohio, or an agitated media mill such as a "Netzsch" mill available from Netzsch, Inc., Exton, Pa. The dispersion is milled for a time sufficient to cause deagglomeration of the PVF. Typical residence time of the dispersion in a Netzsch mill ranges from thirty seconds up to ten minutes.

The concentration of PVF in the dispersion or solution will vary with the particular polymer and the process equipment and the conditions used. In general, the fluoropolymer will comprise from about 30 to about 45% by weight of the dispersion or solution.

The fluoropolymer dispersion or solution so formulated is cast upon a textured support. The instant invention is capable of producing a cast polymer film which is textured in situ in the presence of a latent solvent. By "in situ" it is meant that the fluoropolymer film is textured as the film is being cast onto the textured support. Normally, only one side of the fluoropolymer film is fully textured; the opposite side of the film may pick up some patterning depending upon the thickness and viscosity of the applied fluoropolymer coating. By "texture" or "textured" it is meant a visibly distinct surface structure or pattern that creates a nonplanar surface. While texture includes a virtually unlimited array of suitable patterns, examples of such patterns include geometric structures, lines or curves, wood grain, various leather grain patterns, floral designs, embossing, among others. The instant Examples provide further details regarding the characteristics of the textured film.

The textured fluoropolymer film is formed by casting the dispersion onto a textured support or carrier web by using any suitable conventional means, such as spray, roll, knife, curtain, gravure coaters, or among other methods that permit applying a substantially uniform film without streaks or other defects. The thickness of the cast fluoropolymer dispersion is not critical, so long as the resulting film has sufficient thickness to be self-supporting and be satisfactorily separated from the support onto which the dispersion is cast. In general, a thickness of at least about 0.25 mil (6 $\mu$m) is satisfactory, and thicknesses of up to about 15 mils (380 $\mu$m) can be obtained by using the dispersion casting techniques of the present invention.

A wide variety of supports can be used for forming textured films according to the present invention, depending on the particular polymer and the coalescing conditions. The surface onto which the dispersion is cast should be textured and selected to provide easy removal of the finished film after it is coalesced. The textured support or carrier web may be a textured paper, plastic, or elastomeric web or metal support. Particularly useful in this invention are textured papers available from S. D. Warren Company (USA) and Scheufelen Company (Germany). These products typically consist of a chemically-digested paper coated with a high-solids dispersion of clay in a latex binder. A release agent, typically either a chromium-fatty acid complex or else a silicone derivative, is usually added. Silica may also be included in the dispersion to control the gloss level of the dried coating. In the manufacture of such paper, paper with the coating is mechanically embossed between two nip rolls, one of which has the desired texture. A wide variety of different texture depths and patterns are available.

The fluoropolymer dispersion is cast onto the textured support and heated to coalesce the dispersion into a film. The conditions used to coalesce the polymer will vary with the polymer used, the thickness of the cast dispersion, among other operating conditions. However, typically, for PVF, oven temperatures of about 340° F. (170° C.) to 480° F. (250° C.) can be used to coalesce the film in air, and temperatures of about 380° F. (190° C.) to about 450° F. (230° C.) have been found to be particularly satisfactory. These oven temperatures, of course, are not representative of the temperatures of the polymer being treated, which will be lower.

Heating the dispersion can be accomplished by either a batch or continuous process. A conventional continuous air flotation oven featuring several different heating zones is a common example of the latter type of process. In such a process, the first zone of the oven is designed to coalesce the polymer with minimal evaporation of the solvent. After the polymer coalesces, the solvent is typically driven off in succeeding ovens zones using air bars which direct heated air to both the top and bottom of the web. Films are typically dried so that the residual solvent content is less than about 1.0 wt. %.

The drying process can produce a textured support or web that is coated with a coalesced fluoropolymer film. If desired, the coated web can be rolled up and subsequently recoated with one or more additional layers of fluoropolymer dispersion. For example, it may be desirable to use first a clear fluoropolymer coating and then apply a fluoropolymer coating which contains pigment. Alternatively, the coated web can be coated with a chemically distinct composition or dispersion.

After coalescence, the finished film may be stripped from the substrate according to conventional techniques. The removed textured film possesses a replication of the physical characteristics, e.g., gloss and texture, and thus exhibits the textural features of the textured support.

The resulting monolayer or multilayer film is then typically treated on the untextured side to improve wettability, which in turn improves adhesion of the film, by using any suitable conventional process such as flame-, corona- or chemically-treating the film. Such process tend to convert the surface of the fluoropolymer film from a relatively low energy surface to a higher energy, partially oxidized surface.

For some applications, it is desirable to leave the film upon the textured support for subsequent processing. One such subsequent processes lamination to a substrate as a protective overlay. Typically, any one of a number of adhesives is applied to permit such lamination of the textured fluoropolymer film to a substrate. The substrate may be metal, glass, ceramic, wood or a synthetic polymer. Polymeric substrates may be either thermoplastic or thermosetting materials. Typical polymeric substrates include but are not limited to rigid or flexible polyvinyl chloride (PVC), acrylics, PVC/acrylic blends, polycarbonate, polystyrene, ABS (acrylonitrile-butadiene-styrene), thermoplastic or unsaturated polyesters, phenolics, epoxies, engineering thermoplastics, among others.

The fluoropolymer film alone or while still in contact with the textured support can be laminated to the substrates listed above. Lamination of the textured film to the above substrates can be performed in any suitable manner, for example, in a hydraulic press, by passing between two nip rolls, by vacuum-bagging in an autoclave, by extrusion/lamination, among other lamination methods.

When the support is maintained in contact with the film during lamination, support is subsequently removed from the laminate structure with the film retaining the textural features of the support.

Textured fluoropolymer films in accordance with the invention and laminates of such film to a thermoformable substrate retain a higher level of texture than the corresponding mechanically-embossed film or laminate when thermoformed under identical conditions. This is illustrated by the textural analysis described in the following and which shows that thermoformed laminates of textured fluoropolymer film prepared according to this invention will have a greater modified texture retention measure (MTRM) than its mechanically-embossed counterpart. In accordance with preferred forms of the invention, thermoformable textured fluoropolymer film and a laminate of such film to a thermoformable substrate are provided which have a modified texture retention measure at 15% area expansion of greater than about 0.9. MRTM determined under other thermoforming conditions will be different but the improvement in texture retention over the mechanically-embossing is maintained.

While the above description places particular emphasis upon the process of casting polyvinyl fluoride PVF upon a textured substrate, the subject matter of the instant invention is applicable to other polymers and casting procedures and to a wide array of end-product applications wherein the properties of fluoropolymer provide enhancement. Examples of the many applications include the outer layer of aircraft decorative laminates, use as graffiti-resistant covering for interior or exterior paneling and flexible fabrics, use as a UV-resistant protective covering for thermoplastic and thermoset parts (such as bumper fascia and fender skirts) on the exterior of automobiles, trucks, buses and trains.

The following Examples are provided to illustrate certain aspects of the instant invention and not to limit the scope of the invention defined in the appended claims. Unless there is an indication to the contrary, the following examples were performed by using commercially available materials.

EXAMPLES

Clear and pigmented polyvinylfluoride dispersions were prepared and cast into textured sample films A, B, and C according to the teachings of this invention. Thermoformed panels, samples 4–6, were prepared by laminating films A, B, and C to thermoplastic sheet with subsequent thermoforming. Thermoformed panels, control samples 1–3, were prepared by laminating untextured PVF film to thermoplastic sheet and mechanically embossing the laminate prior to thermoforming.

The basic ingredient in all of the example films, both textured and untextured varieties, is an unpigmented, unstabilized PVF dispersion. To prepare this dispersion a slurry of standard PVF polymer in propylene carbonate, approximately 40% solids by weight, is prepared in a paddle-driven mixer sold by the Scharr Company. The resulting mixture is transferred into an agitated media (Netzsch) mill containing 1 mm diameter glass spheres. The combined shearing action of the agitator and the glass beads produces a homogenized dispersion of the PVF polymer. The dispersion is transferred to an agitated holding tank where additional propylene carbonate is added to adjust the viscosity for optimum coating. For reverse gravure coating, typical dispersion viscosities range from 1500 to 10000 centipoise (as measured on a Brookfield viscometer at 10 rpm using a No. 3 spindle). The dispersion is filtered to remove large agglomerates then cast onto a carrier web. After coating and drying as described previously the aforementioned dispersion produces transparent PVF film.

Colored PVF films are produced by combining the above-mentioned clear dispersion with the white and single-color pigmented dispersions described below to yield a film with the desired color, optical density, and other appearance properties. The color-matched dispersion is filtered to remove large agglomerates then cast onto a carrier web as previously described.

White pigmented PVF dispersion is prepared using silica-encapsulated titanium dioxide (such as DuPont TI-PURE® R-960) and finely divided PVF polymer (average particle size less than one micron). The PVF polymer, $TiO_2$, and dispersing agents (such as polyvinylpyrollidone, PVP) are mixed with propylene carbonate in a high speed disperser (HSD) to give a homogeneous dispersion.

Single-pigment, colored PVF dispersions ("mill bases") are prepared using N-methyl-2-pyrollidone (NMP) as solvent instead of propylene carbonate. These mill bases are prepared in the same type of equipment as described above for clear PVF dispersion. The desired pigment, finely-divided PVF polymer, and dispersing agent are mixed with NMP in a Scharr mixer then homogenized in a Netzsch mill.

Textured PVF film "A", as well as the untextured "control" film (Tedlar® cast PVF film from DuPont) were prepared by casting unpigmented PVF dispersion onto a paper carrier. Both of these films are monolayer products. Film "A" used a textured paper, "Stripkote* EHR (Wallaby)" from the S. D. Warren Company, as carrier. The control film was coated onto an untextured paper web, "BL42" from Akrosil. Film "A" has a nominal thickness of 1.5 mils (38 micrometers), whereas the control film is nominally 1-mil (25 micrometers) thick.

PVF dispersion which matches a brown color used by Metro North Railroad was produced by mixing 4.8 parts by weight of white (titanium dioxide) dispersion, 0.49 parts iron oxide yellow dispersion, 0.09 parts carbon black dispersion, 0.11 parts iron oxide red dispersion, and 10.3 parts transparent PVF dispersion. Brown, multilayer film "B" was produced by first casting unpigmented PVF dispersion (additionally containing approx.0.2 wt. % antioxidant, such as Irganox 1035) onto "Transkote* GEHR (Naples)" textured paper, available from S. D. Warren Company (U.S.). After coalescing and drying, the resulting transparent film was then coated with the aforementioned brown PVF dispersion to yield a multilayer (clear/brown) textured PVF film. In use, the clear side of the multilayer construction faces the outside of the formed part. Nominal film thickness is 3 mils (76 micrometers).

Dispersion having a color that matched Pantone "Cool Grey 10" was produced by mixing 8.0 parts by weight of titanium dioxide dispersion, 0.19 parts iron oxide yellow dispersion, 0.42 parts carbon black dispersion, 0.09 parts iron oxide red dispersion, and 7.3 parts transparent PVF dispersion. The resulting mixture consisted of 44 wt % solids, of which 16 percent was titanium dioxide and other pigments. The remainder was PVF polymer. Film "C" was a clear/pigmented construction, similar to example "B" above. It was made by first casting unpigmented PVF dispersion onto "Stripkote EHR (Falmouth)" textured paper available from S. D. Warren Company (U.S.). After coalescing and drying, the resulting transparent film was then coated with the aforementioned "Cool Grey 10" PVF dispersion to yield a multilayer (clear/grey) textured PVF film having a nominal thickness of 3 mils (76 micrometers).

Thermoformed control panels 1–3 are made by first laminating untextured clear cast polyvinylfluoride film to flat PVC/acrylic sheet [R-61 from Royalite Division of Uniroyal Technology Corp., nominal thickness 0.125 inches (3.17 mm)]. DuPont 68080 acrylic adhesive (dry film thickness of approx. 0.2 mils (5 micrometers) is used to bond the Tedlar® film to the substrate. The three panels were embossed during lamination by pressing them against rigid epoxy embossing plates in a heated hydraulic press at temperatures of 300° F. (149° C.), 340° F. (171° C.), and 380° F. (193° C.), respectively. The resulting sheets were then vacuum-formed at 360° F. (1 82° C.) against a shallow-draft, rectangular, wooden mold in a shuttle-type thermoformer. Two different areas on each of the resulting thermoformed panels were imaged for subsequent texture retention measurements. One area was at the edge of the panel. This area was restrained underneath the clamping mechanism of the thermoformer and, consequently, was shielded from the effects of temperature and sheet expansion during the thermoforming process. The other area was on the raised, rectangular surface of the mold. This area was exposed directly to the heating source of the thermoformer. The surface area of the textured sheet expanded by about 15% in this location.

Thermoformed panels 4–6 were prepared by laminating in-situ textured PVF films A, B, and C, respectively, in a heated hydraulic press to the substrates noted below and then thermoforming the panels. DuPont 68080 acrylic adhesive [dry film thickness of approx. 0.2 mils (5 micrometers)] was used to bond the textured PVF film to the substrate in each case. The textured film was maintained in contact with the carrier web through the lamination step, then peeled off prior to thermoforming. The resulting sheets were then vacuum-formed at 360° F. (182° C.) using the same mold and thermoformer as mentioned above for the embossed samples.

THERMOFORMED PANELS 1,2,3 (CONTROL)

Panel 1: Clear, untextured cast PVF film press laminated to R-61 sheet and mechanically embossed at 300° F. (149° C.) against embossing plates.

Panel 2: Clear, untextured cast PVF film press laminated to R-61 sheet and mechanically embossed at 340° F. (171° C.) against embossing plates.

Panel 3: Clear, untextured cast PVF film press laminated to R-61 sheet and mechanically embossed at 380° F. (193° C.) against embossing plates.

THERMOFORMED PANELS 4,5,6

Panel 4: Film sample "A" in contact with the textured support is press-laminated at 300° F. (149° C.) for 5 minutes at 20 psi (5 megapascal per meter) to brown R-61 sheet.

Panel 5: Film sample "B" in contact with the textured support is press-laminated at 300° F. (149° C.) for 5 minutes at 20 psi (5 megapascal per meter) to brown R-61 sheet.

Panel 6: Film sample "C" in contact with the textured support is press-laminated at 300° F. (149° C.) for 15 minutes at 20 psi (5 megapascal per meter) to white ABS sheet.

SHEET PANEL 7

Panel 7: Film sample "C" press-laminated at 300° F. (149° C.) for 15 minutes at 20 psi (5 megapascal per meter) to white ABS sheet.

The panels were analyzed to determine the texture of their surfaces before and after thermoforming and the results are reported in Table 1. Panels 4–6 which contained fluoropolymer films textured in-situ according to this invention retained a greater amount of surface texture after thermoforming than panels 1–3 which contained fluoropolymer films which were mechanically embossed. The same conclusion was reached for all three textures: "Falmouth" (mild), "Wallaby" (moderate), and "Naples" (coarse).

Textural Analysis Method

Texture analysis was conducted substantially in accordance with the teachings of U.S. Pat. No. 5,325,301 to Knopf et al. and an article entitled "Textural Features for Image Classification," by Haralick, Shanmugan and Dinstein, IEEE Transactions on Systems, Man and Cybernetics, Vol, SMC-3, No. 6, November 1973, pp. 610–621, the disclosure of both of which are incorporated herein by reference. The image analysis method described in the referenced patent employs a model based on a second order co-occurrence matrix model which calculates a set of textural parameters for image classification. This co-occurrence matrix model examines the statistics of the spatial relationship between gray levels in a homogeneously textured image and quantifies the textural features (for example, homogeneity and contrast). Previously textural analysis had been limited to subjective evaluation by expert judges. The method employed in the present analysis uses this model to construct a set of normalized textural parameters from the textural parameters and calculates a value for the normalized textural parameters from this set. The normalized textural values are related to the physical properties of the surface, in this case the degree of embossing of the surface. The method compares the value for each of the normalized textural parameters of a panel before and after thermoforming. The area of the thermoformed panel which was measured had experienced an area expansion of 15%.

Each test panel had an edge portion which had not been subjected to the thermoforming process and a molded portion which had been subjected to the thermoforming process. The only exception was panel 6 where the edge portions had been inadvertently discarded prior to testing. For that reason, a flat sheet panel 7 was analyzed which was identical to the edge portions of panel 6.

The sample panels were prepared as above with no need for additional stroking or other sample preparation as has been disclosed in the referenced U.S. patent. Six fields were imaged along the edge of each panel (three on each side times two sides) and six fields were imaged on the molded portion of each panel, hereinafter referred to as the "top" of the panel (once again, three on each side of the top times two sides). Thus, a total of 12 fields (six edge fields and six top fields) were imaged per panel. The field of view for each image was 1.5 cm×1.2 cm. Only horizontal surfaces were imaged. To accentuate the texture on the surfaces, oblique illumination was used in that the panel was positioned at an oblique angle of approximately 40.6 degrees to the illumination source.

Textural analysis following Haralick was performed on each image and the results for the six edge fields were averaged as were the results for the six top fields. An intrinsically invariant feature known as the Angular Second Moment (ASM) was used to characterize the uniformity of the surface over a spatial distance of approximately 468.75 microns. The ASM feature is useful in that it is invariant against illumination variations and is a measure of the homogeneity of the surface. The results are shown in Table 1.

1. Texture retention measure (TRM):

$$TRM = 1.0 - \frac{\sum_{d=1}^{99} ASM(d)\text{top} - \sum_{d=1}^{99} ASM(d)\text{edge}}{\sum_{d=1}^{99} ASM(d)\text{top} + \sum_{d=1}^{99} ASM(d)\text{edge}}$$

where the ASM feature was summed from d=1 to d=99 spatial periods corresponding to a physical range from 23.4 microns to 2.320 mm. By summing the ASM feature over all the spatial periods the effect of texture "shifts" from one frequency range to another was minimized.

2. "Absolute" texture measures for the top and edge sections of panels (ATM):

$$ATM = \frac{\sum_{d=1}^{99} ASM(d) - ASM(0)}{\sum_{d=1}^{99} ASM(d) + ASM(0)}$$

where ASM(0) is the ASM feature calculated at spatial period 0. The ATM quantity was calculated for both the top and edge sections of the panel. The larger the ATM measure, the more texture present in the sample.

3. "Modified Texture Retention Measure" MTRM is another, more robust measure of texture retention which may be used to define the present invention.

$$MTRM = 1.0 - \frac{ATMedge - ATMtop}{ATMedge + ATMtop}.$$

TABLE 1

| Sample | TRM | ATM edge | ATM top | MTRM |
|---|---|---|---|---|
| 1 | 0.154 | 0.923 | 0.659 | 0.833 |
| 2 | 0.177 | 0.926 | 0.681 | 0.847 |
| 3 | 0.199 | 0.926 | 0.710 | 0.868 |
| 4 | 0.218 | 0.951 | 0.821 | 0.927 |
| 5 | 0.422 | 0.945 | 0.880 | 0.965 |
| 6 | 0.371 | 0.912* | 0.796 | 0.932 |

*value obtained from the analysis of sheet panel 7

What is claimed is:

1. A process of preparing a textured fluoropolymer film comprising:
   (a) preparing a fluid composition of fluoropolymer resin;
   (b) casting the fluoropolymer composition onto a textured support;
   (c) forming a coalesced fluoropolymer film layer on the support;
   (d) drying the fluoropolymer film layer while in contact with the support;

(e) removing the support from the fluoropolymer film which film exhibits the textural features of the textured support; and (f) thermoforming the textured film, whereby the fluoropolymner film retains the textural features of the textured support after thermoforming.

2. The process according to claim 1 further comprising laminating the film to a substrate to form a laminate structure prior to thermoforming.

3. The process according to claim 1 further comprising laminating the dried fluoropolymer film while still in contact with the textured support onto a substrate to form a laminate structure prior to removal of the support.

4. The process according to claim 3 further comprising thermoforming the laminate structure after removal of the support.

5. The process according to claim 1 wherein the fluoropolymer film is polyvinyl fluoride.

6. The process according to claim 1 wherein the textured film prepared by the process has a modified texture retention measure at 15% area expansion of greater than about 0.9.

* * * * *